May 25, 1965  J. S. TAYLOR ETAL  3,184,826
PORTABLE SCRAPER FOR GRIPPER DIES OF STRIP WELDER
Filed May 27, 1963  2 Sheets-Sheet 1

INVENTORS.
JAMES S. TAYLOR and
WILLIAM A. TURNER
By Donald G. Dalton
Attorney

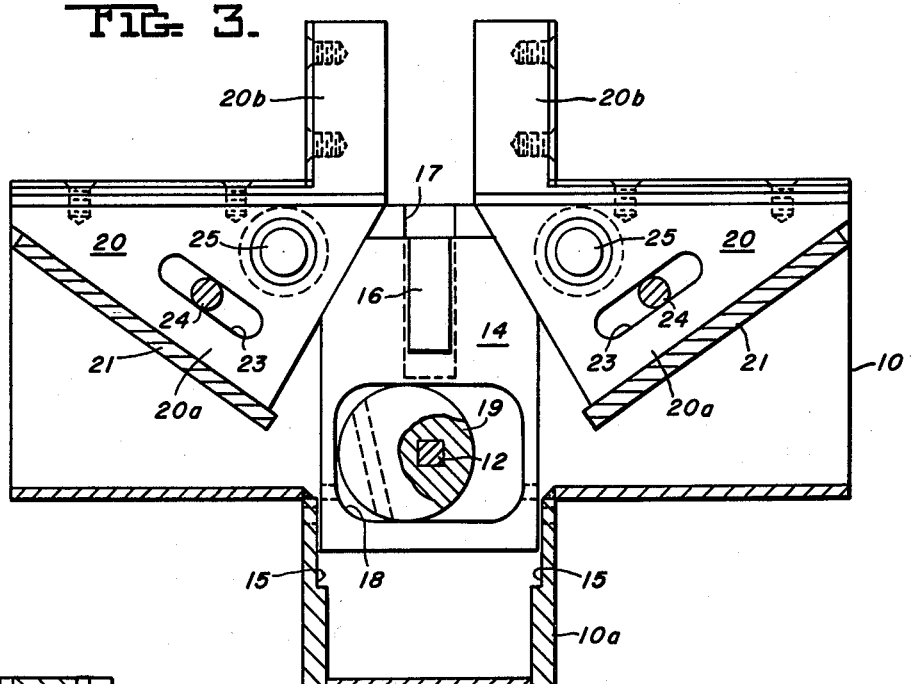
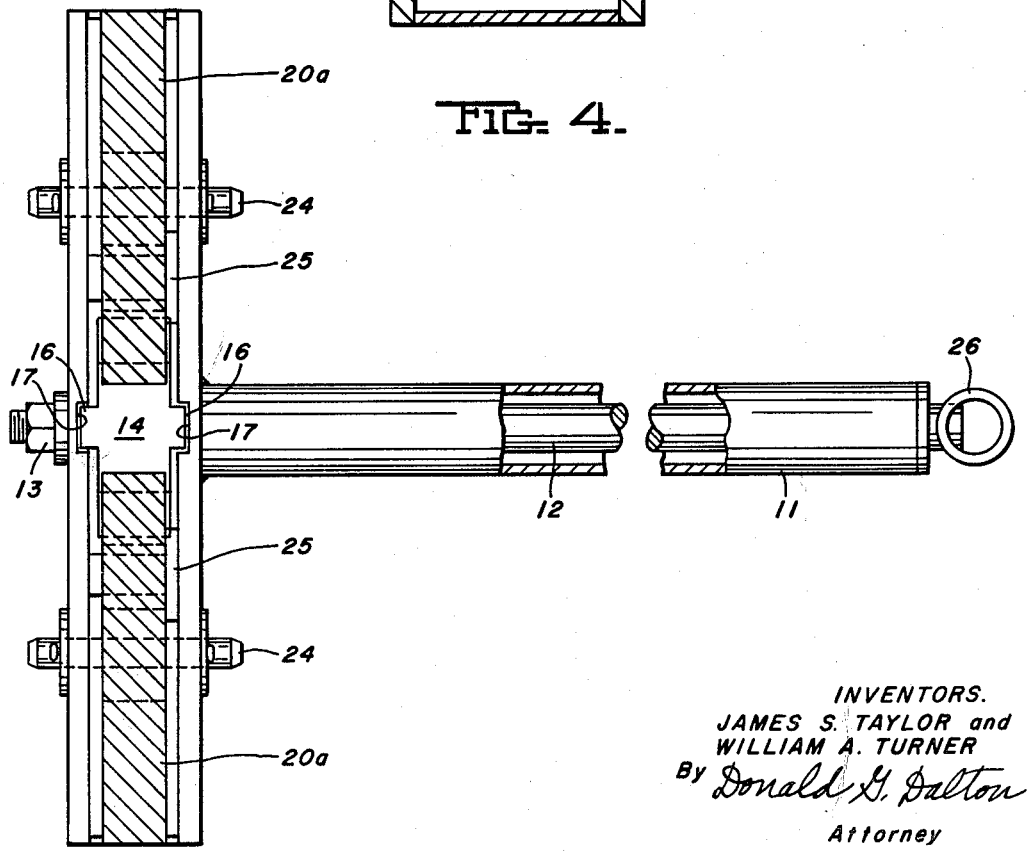

3,184,826
PORTABLE SCRAPER FOR GRIPPER DIES OF STRIP WELDER

James S. Taylor, Morrisville, and William A. Turner, Lower Makefield Township, Bucks County, Pa., assignors to United States Steel Corporation, a corporation of New Jersey
Filed May 27, 1963, Ser. No. 283,489
6 Claims. (Cl. 29—81)

This invention relates to a portable tool and, in particular, to a hand scraper for removing accumulations of slag from the gripper jaws of an electric butt welder for joining the ends of lengths of metal strip.

In the processing of metal strip, such as the pickling of steel strip after hot-rolling, it is the practice to butt weld the leading end of one length to the trailing end of the preceding length, to effect continuity in operation. In one type of welder used for the purpose, each strip end is clamped between a pair of gripping electrode jaws and the pairs of jaws caused to approach each other bringing the strip ends into abutment for flow of current across the joint therebetween necessary to effect an electric-resistance weld. The jaws are simply long straight bars of substantial section.

In operation of such strip-end butt welders, a considerable accumulation of slag occurs on the faces of the jaws beyond the strip edges as a result of spittings from the welded seam as it is formed. These deposits of slag may tend to interfere with good contact between the jaws and strips ends and may prevent movement of the pairs of jaws toward each other as desired and preclude formation of a strong uniform weld joining the latter. Heretofore, periodic removal of slag accumulations has been effected with conventional hand tools but the operation has been laborious and time-consuming. It is accordingly the object of our invention to provide a special tool which makes the task easy and efficiently removes slag accumulations in a single operation.

In a preferred form of the invention, we slidably mount spaced opposed scraper blocks in a housing and provide a wedge therein for forcing the blocks into engagement with the surfaces of the jaws to be cleaned. The housing is mounted on an elongated handle by which it may be manipulated. A shaft extending through the handle has a cam thereon for actuating the wedge.

A complete understanding of the invention may be obtained from the following detailed description and explanation which refer to the accompanying drawings illustrating the present preferred embodiment. In the drawings:

FIGURES 3 and 4 are sections taken along the planes of lines III—III and IV—IV of FIGURE 2, respectively.

Figure 1:
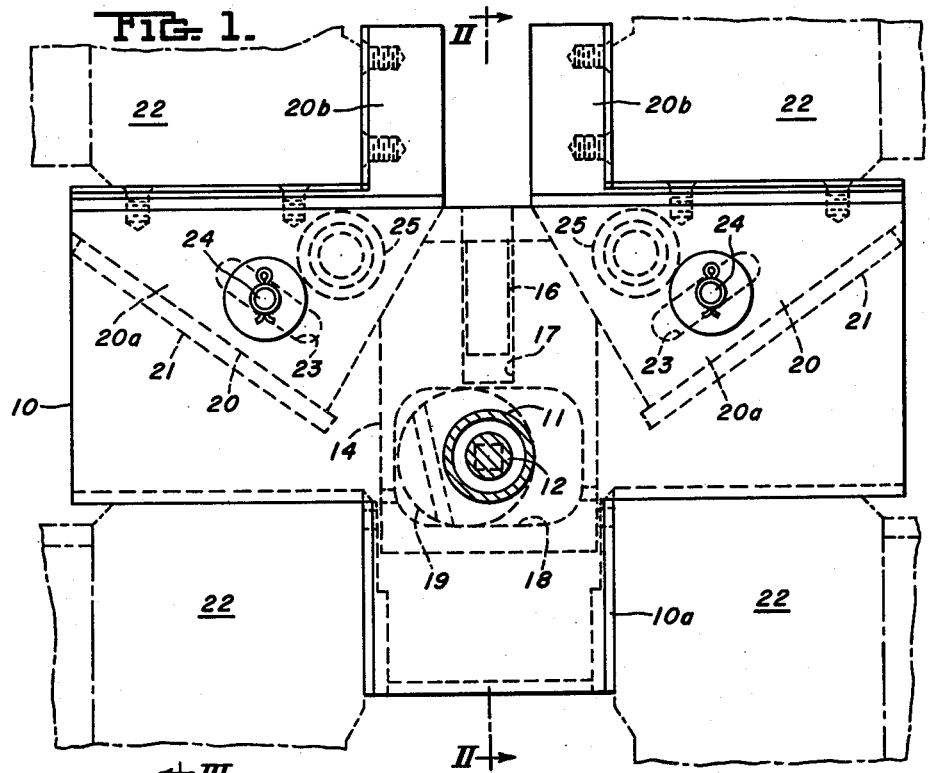
FIGURE 1 is an elevation showing the manipulating handle in cross section.
Figure 2:
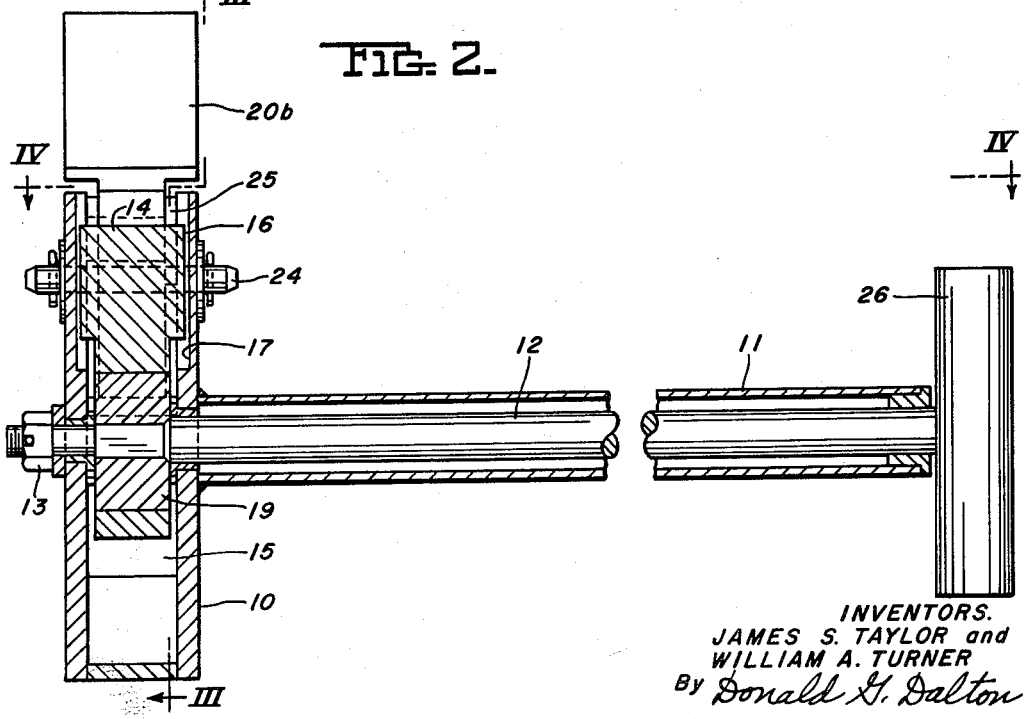
FIGURE 2 is a section taken along the plane of line II—II of FIGURE 1.

Referring now in detail to the drawings, our improved tool comprises an elongated open-topped box-like housing or head 10 of T-shape with a central depending or laterally extending portion 10a, having a tubular handle 11 affixed to one face plate thereof, as by welding. A shaft 12 extends through the handle and head and is journaled in suitable bearing bushings therein. The shaft is secured in position by a nut 13 threaded on the reduced shaft end protruding from the head. A wedge 14 is vertically reciprocable in head 10. The sides of the wedge are slidable in recesses 15 formed in the side walls of the head and the broad faces of the wedge have ribs 16 sliding in slots 17 formed on the interior of the face plates of the head. Wedge 14 has an opening 18 therethrough to accommodate a cam 19 fixed on shaft 12 within the head 10.

A pair of spaced opposed scraper blocks 20 are slidable in head 10, from and toward each other, on inclined webs 21. The blocks have a lower portion 20a of inverted-triangle shape and upstanding portions 20b which, together, define dihedral angles adapted to fit closely the horizontal and vertical faces of welder gripper jaws shown in chain lines at 22. The faces of the angularly related portions 20a and 20b have wear plates removably secured thereto. The blocks have inclined slots 23 therein and guide pins 24 seated in the face plates of the head extend through these slots. Flanged spacer bushings 25 extend through the blocks and engage the inner surfaces of the head face plates.

It will be evident from the foregoing that rotation of the shaft 12 will cause reciprocation of wedge 16 with consequent spreading pressure on blocks 20, or the release thereof. To facilitate such rotation, shaft 12 is provided with a T-head 26 at the outer end of handle 11. Thus, to apply the tool to its intended use, the central depending portion 10a of head 10 is disposed between the lower jaws 22, for example, with the scraper blocks 20 contracted. Then, by the turning of shaft 12, the blocks 20 are forced into engagement with the upper jaws 22 whereupon the tool is manually advanced the full length thereof, by handle 11, and then retracted. Usually a single complete forward and return stroke will suffice to clear slag deposits from both the vertical and horizontal surfaces of the upper jaws. A reversal of the tool permits similar treatment of the lower jaws.

The invention is simple in construction and effective in operation. It greatly reduces the time and labor needed to keep the clamping jaws in good condition and thus saves downtime of the strip-end welder.

Although we have disclosed herein the preferred embodiment of our invention, we intend to cover as well any change or modification therein which may be made without departing from the spirit and scope of the invention as set forth in the claims.

We claim:

1. A tool for scraping the adjacent corners of spaced pairs of spaced elongated parallel electrode gripper-jaw bars, comprising a head of elongated open-topped box construction adapted to extend between the two bars of both said pairs, said head having a lateral extension adapted to fit between two corresponding bars, one from each of said pairs, an elongated manipulating handle extending normal to the length of said head, a pair of spaced opposed scraper blocks having cutting-edge portions of dihedral shape adapted to fit closely the corners of two bars, one from each of said pairs, said blocks fitting snugly in said head and being slidable therein, means movable in said head for moving said blocks away from each other and a control-member in said handle for rotating said means.

2. A tool as defined in claim 1, characterized by said means including a wedge reciprocable in said head.

3. A tool as defined in claim 2, characterized by said head having internal ways guiding movement of said wedge.

4. A tool as defined in claim 1, characterized by said member being a cam shaft.

5. A tool as defined in claim 4, characterized by said handle being tubular and said shaft extending through the handle.

6. A tool as defined in claim 1, characterized by said head having internal inclined ways on which said blocks are slidable.

References Cited by the Examiner

UNITED STATES PATENTS

| | | |
|---|---|---|
| 2,135,912 | 11/38 | Rae. |
| 3,113,466 | 12/63 | Osborne _____ 25—104 X |

FOREIGN PATENTS 699,624  12/40  Germany.

WALTER A. SCHEEL, *Primary Examiner*.

JOSEPH D. BEIN, *Examiner*.